US008085629B2

United States Patent
Janssen et al.

(10) Patent No.: US 8,085,629 B2
(45) Date of Patent: Dec. 27, 2011

(54) OPTICAL FOCUS ERROR OFFSET TO REDUCE RADIAL TO VERTICAL CROSSTALK

(75) Inventors: Edwin Johannes Maria Janssen, Eindhoven (NL); Pieter Hoeven, Eindhoven (NL); Hendrikus Albertus Johanna Looijmans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1037 days.

(21) Appl. No.: 11/721,488

(22) PCT Filed: Dec. 15, 2005

(86) PCT No.: PCT/IB2005/054260
§ 371 (c)(1),
(2), (4) Date: Jun. 12, 2007

(87) PCT Pub. No.: WO2006/067698
PCT Pub. Date: Jun. 29, 2006

(65) Prior Publication Data
US 2009/0290457 A1 Nov. 26, 2009

(30) Foreign Application Priority Data
Dec. 20, 2004 (EP) .................................... 04106723

(51) Int. Cl.
*G11B 7/09* (2006.01)
*G11B 7/00* (2006.01)

(52) U.S. Cl. .................................. 369/44.29; 369/53.28
(58) Field of Classification Search .... 369/44.27–44.36, 369/47.36, 47.38–47.4, 47.44–47.46, 47.49, 369/47.55, 53.12, 53.19–53.2, 53.22–53.23, 369/53.25, 53.28, 53.37
See application file for complete search history.

(56) References Cited

U.S. PATENT DOCUMENTS

| 6,034,936 | A  | * | 3/2000 | Ogawa et al. | ............... 369/53.28 |
| 6,633,523 | B1 | * | 10/2003 | Masaki et al. | ............... 369/44.32 |
| 2002/0136115 | A1 | | 9/2002 | Kadlec et al. | |
| 2002/0141302 | A1 | | 10/2002 | Kadlec et al. | |

FOREIGN PATENT DOCUMENTS

| JP | 3273529 A | 12/1991 |
| JP | 6295448 A | 10/1994 |
| JP | 7262571 A | 10/1995 |
| JP | 10105995 A * | 4/1998 |
| JP | 2003162826 A | 6/2003 |
| WO | WO0133560 A1 | 5/2001 |

OTHER PUBLICATIONS

Machine-Assisted Translation of JP 10105995 A.*
Machine-Assisted Translation of JP 2003162826 A.*

* cited by examiner

*Primary Examiner* — Nathan Danielsen

(57) ABSTRACT

A method and system are provided for minimizing or optimising radial to vertical crosstalk (RVC) in an error signal in an optical record carrier reader is record carrier losed. Focus error offset values are applied to the reader. The radial to vertical crosstalk is determined after each focus error offset value is applied. The focus error offset value which minimizes or optimises the radial to vertical crosstalk is selected for use by the reader.

Figure 1:
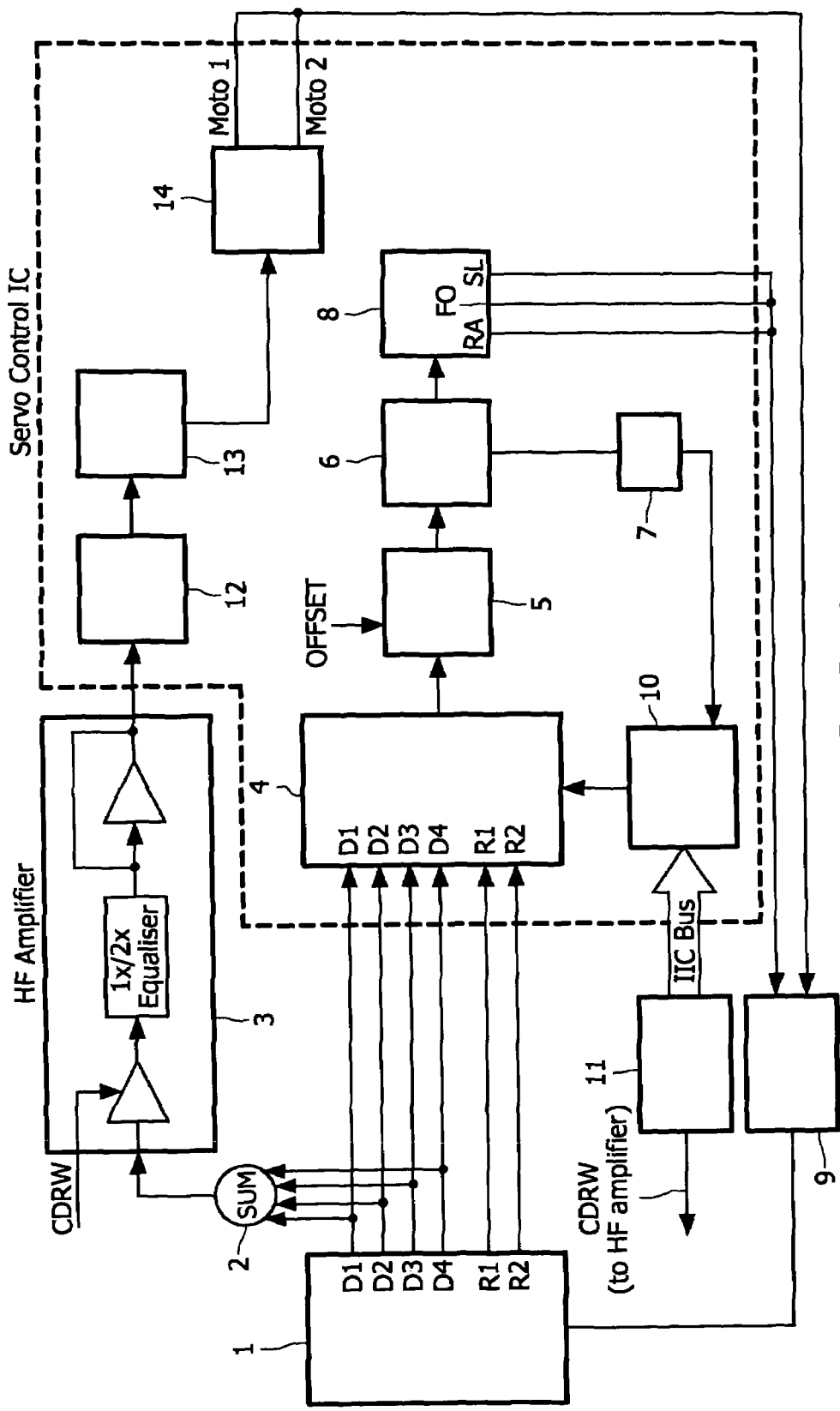

12 Claims, 4 Drawing Sheets disc=DVD+R written
focus offset = 0
signals (up to bottom) : Mirn, Vfocus_coils, Ren, FEn disc=DVD+R written
focus offset = +20
signals (up to bottom) : Mirn, Vfocus_coils, Ren, FEn disc=DVD+R written
focus offset = -20
signals (up to bottom) : Mirn, Vfocus_coils, Ren, FEn

OPTICAL FOCUS ERROR OFFSET TO REDUCE RADIAL TO VERTICAL CROSSTALK

This invention pertains in general to the field of optical record carrier players. More particularly the invention relates to the effect of radial to vertical crosstalk on actuator steering in the optical record carrier player and more particularly to minimizing or optimizing the radial to vertical crosstalk by adding an offset to the focus error signal (focus error offset).

Different formats of optical recording media including read-only optical record carriers, such as CD (Compact Disk), and DVD (Digital Versatile Disc); and recordable optical discs such as a CD-R (Compact Disc-Recordable), CD-RW (Compact Disc-Rewritable) and DVD+RW (Digital Versatile Disc+Rewritable) are well known. These optical recording media may be written and/or read out by means of an optical pick up unit in an optical scanning device. The optical pick up units are mounted on a linear bearing for radially scanning across the tracks of the optical disc.

The optical scanning device comprises a light source such as a laser which is directed toward the optical disc. In addition to detecting and reading the information from the optical disc, the optical pick up unit also detects a variety of error signals, e.g. focus error, radial error and tracking error. These error signals are used by the optical scanning device to adjust various aspects of the scanning procedure to help reduce these errors. For example, the focus error signal can be used to determine how much the focus actuator should be steered to improve the focus of the laser.

Unfortunately, an optical phenomenon known as Radial to Vertical Crosstalk (RVC) or Radial to Focus Crosstalk (RFC) interferes with the error signals received by the optical pick up device. When the laser is on and the focus loop is closed but the radial loop is open, part of the radial error signal is seen in the focus error signal. This crosstalk in the focus error signal thus changes the actual value of the focus error. The focus actuator will then be steered based on erroneous error information. This non-desired focus actuator steering can result in a variety of problems. The erroneous steering may cause the focus actuator to operate for longer periods of time, thus increasing the power dissipation by the actuator. The power dissipation can result in saturation of the focus actuator driver's integrated circuits. The extra power dissipation results in extra heat production in the actuator and the driver. The erroneous focus movement can result in focus loss, during, for example, seek/sledge movements or radial open loop situations on high eccentricity discs. In addition, the de-focusing caused by the RVC causes the servo error signals to be strongly abberated. Finally, since many error signals need to be calibrated and optimized, e.g., radial initialization (scaling and offset removal of radial error signal), a high RVC results in non-optimally scaled error signals which adversely effects the operation of the optical scanning device.

Thus, there is a need for a method for minimizing or optimizing radial to vertical crosstalk during radial open loop situations. Furthermore, the amount of RVC created by the optical scanning device is dependent on each device. Deterioration of the optical pickup unit and the optical scanning device over the lifetime of the device and damp-heat cooldown-heatup situations introduce shifting of photodetectors, lenses, etc. These aberrations are inevitable and play a role in the amount of RVC each device creates. Hence, an improved method for minimizing or optimizing the amount of RVC created by individual optical scanning device would be advantageous.

Accordingly, the present invention preferably seeks to mitigate, alleviate or eliminate one or more of the above-identified deficiencies in the art and disadvantages singly or in any combination and solves at least the above mentioned problems by providing a system, a method, and a computer-readable medium that minimize or optimize radial to vertical crosstalk according to the appended patent claims.

According to one aspect of the invention, a method is provided for reducing radial to vertical crosstalk in an error signal in an optical record carrier reader is disclosed. The method comprises the steps of: applying a plurality of focus error offset values to the reader; determining radial to vertical crosstalk after each focus error offset value is applied; selecting the focus error offset value which minimizes the radial to vertical crosstalk for use by the reader.

According to another aspect of the invention, a system is provided for reducing radial to vertical crosstalk in an error signal in an optical record carrier reader is disclosed. The system comprises: means for applying a plurality of focus error offset values to the reader; means for determining radial to vertical crosstalk after each focus error offset value is applied; and means for selecting the focus error offset value which minimizes the radial to vertical crosstalk for use by the reader.

According to a further aspect of the invention, a computer-readable medium having embodied thereon a computer program for processing by a computer is provided. The computer program, which comprises code segments for reducing radial to vertical crosstalk in an error signal in an optical record carrier reader, is disclosed. The code segments comprise a first code segment for applying focus error offset values to the reader; a second code segment for determining radial to vertical crosstalk after each focus error offset is applied; and a third code segment for selecting the focus error offset which minimizes the radial to vertical crosstalk for use by the reader. The present invention has at least the advantage over the prior art that it may minimize or optimize the radial to vertical crosstalk created by individual optical record carrier readers.

Figure 2:
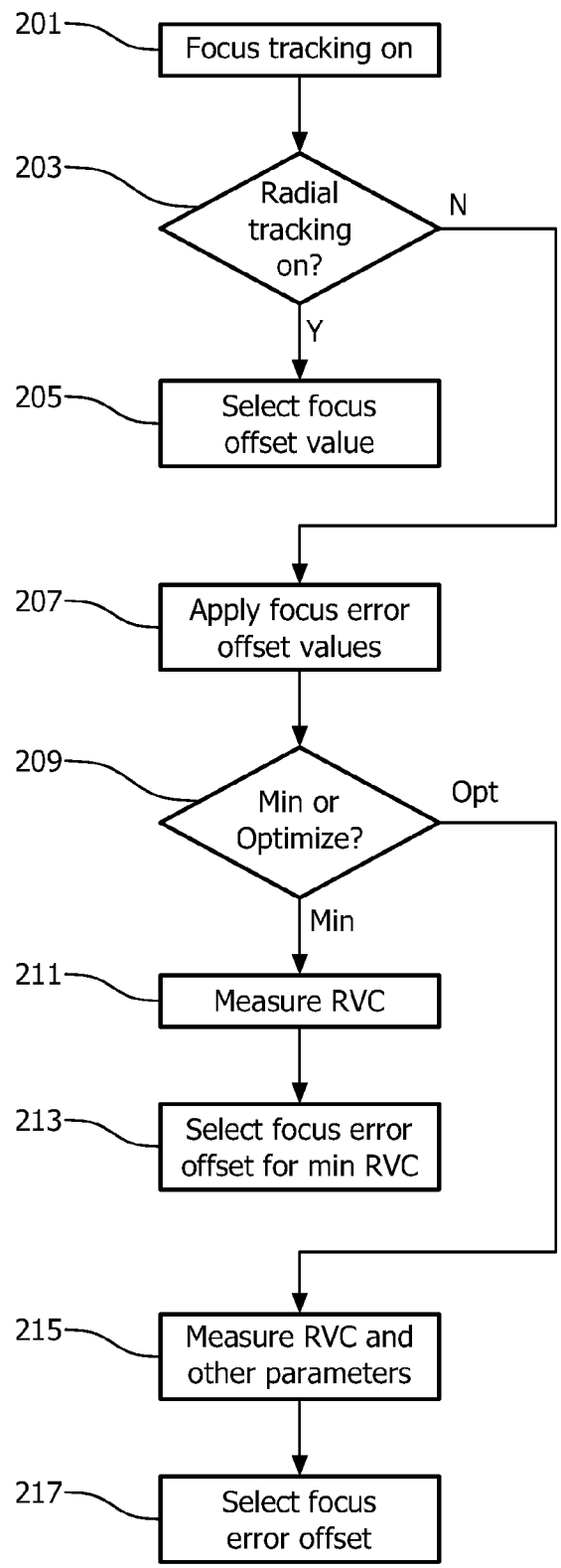
Figure 3A:
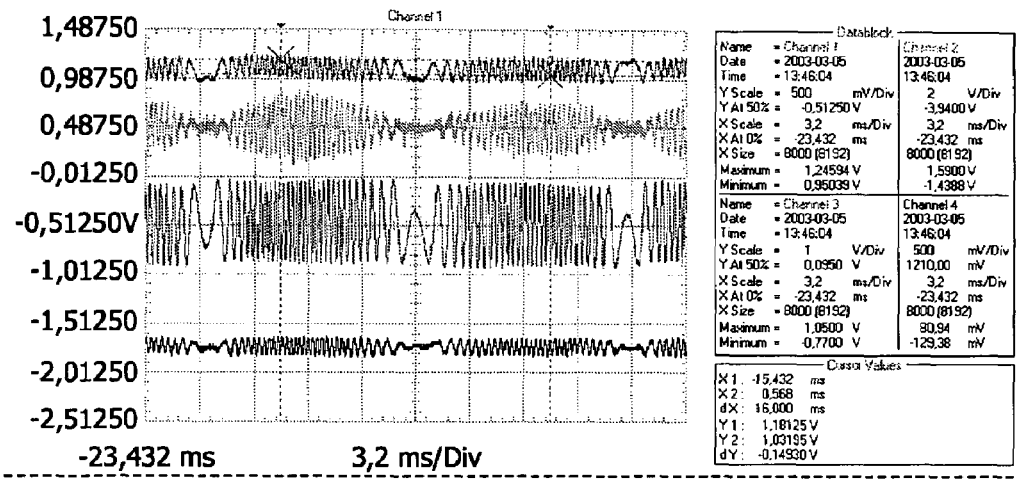
Figure 3B:
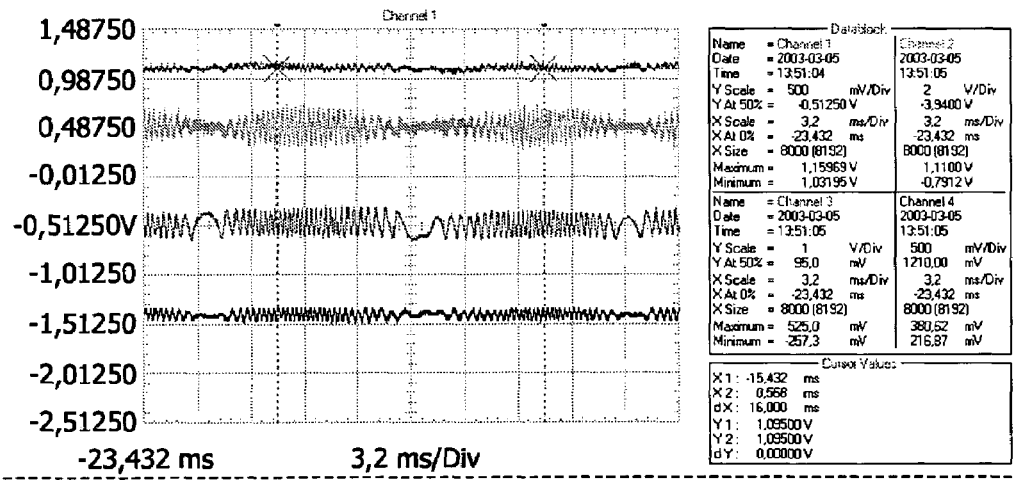
Figure 3C:
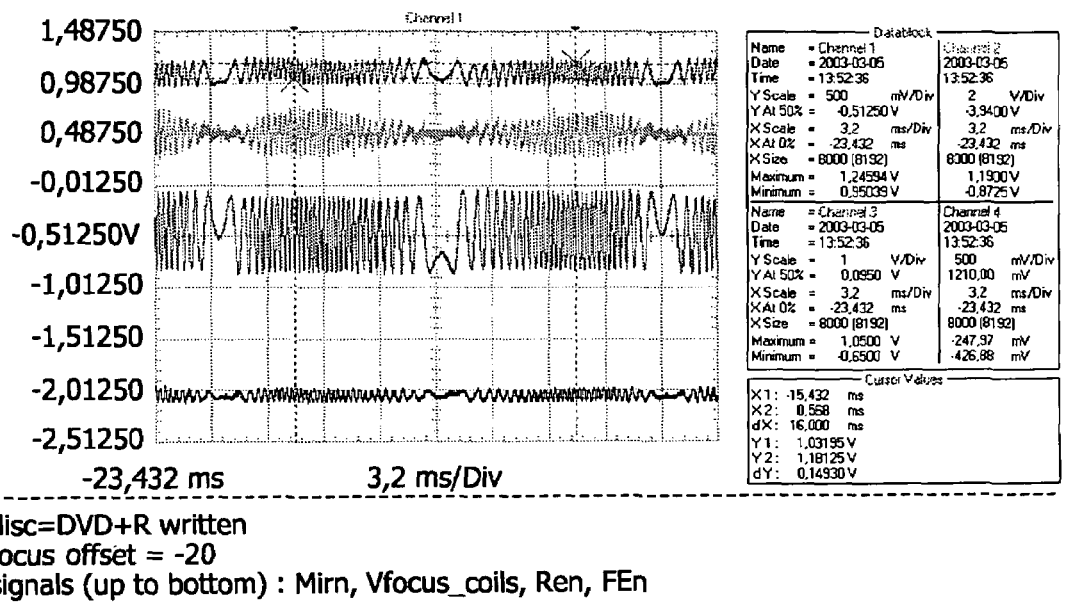

These and other aspects, features and advantages of which the invention is capable of will be apparent and elucidated from the following description of embodiments of the present invention, reference being made to the accompanying drawings, in which FIG. 1 is a block diagram of a servo control system of an optical disc player which incorporates the invention;

FIG. 2 is a flow chart illustrating a method for minimizing or optimizing radial to vertical crosstalk according to one embodiment of the invention; and FIGS. 3(a)-(c) illustrate voltage readings of various parameters with different focus offset values being applied to an optical disc player according to one embodiment of the invention.

The following description focuses on an embodiment of the present invention applicable to a optical disc player and in particular to an optical disc reader. However, it will be appreciated that the invention is not limited to this application but may be applied to many other optical scanning systems.

As shown in FIG. 1, the servo control system for an optical disc player according to one embodiment of the invention comprises a conventional laser mechanism 1 which contains an illuminating laser and associated optics for focussing the laser on the information surface of an optical disc. The laser mechanism 1 also includes appropriate detectors for detecting the radiation reflected from the disc in order to produce signals representing the data and indicating tracking of the information tracks. Also included is a motor for rotating the disc, means for focussing the laser radiation on selected portions of the disc under control of signals generated within the servo control system, and means for moving the reading head radially across the disc.

Four outputs D1-D4 from the laser mechanism 1 are summed in a summer 2 and fed to a high frequency amplifier 3. The four outputs D1-D4 together with two further outputs R1 and R2 are fed to an analogue to digital converter block 4, the output of which is passed to the pre-processing block 5 to the focus error offset signal can be added at this point before the signals enter a PID controller 6. A first output of the PID controller 6 is fed to a focus detector 7, while a second output is fed to an output stage 8 which produces outputs to control the focussing of the laser on the disc (FO), the fine radial positioning of the laser head on the disc (RA), and the sledge position (SL) which provides a coarse positioning of the read head with respect to tracks on the disc. The three outputs of the output stage 8 are fed through power amplifiers 9 to the laser mechanism 1. The output of the focus detector 7 is fed via an interface 10 to the controlling microprocessor 11.

The output of the amplifier 3 is fed to a front end circuit 12 which slices and converts the signal so that it is in the required form for application to a digital phase locked loop (DPLL) 13, an output of which is fed to a motor control circuit 14 which controls the speed of the spindle motor to cause the disc to be rotated at the desired speed for correct reading of the data from the disc. The output of the motor control circuit is fed through the power amplifiers 9 to the spindle drive motor. The controlling microprocessor 11 produces a signal that is arranged to vary the gain of the amplifier 3 according to whether a disc having high reflectivity, that is a CD Audio, CDROM, DVD, or the like, or a disc having a low reflectivity that is a CD-RW, BD, HD-DVD (AOD), or the like. Thus, the gain of the amplifier is increased when a low reflectivity disc is being played as the received signal will have a lower amplitude than one received from a high reflectivity disc. In addition the controlling microprocessor 11 increases the sensitivity of the analogue to digital converter block 4 to compensate for the lower levels of the signals D1-D4, R1 and R2. Thus far the servo control system is conventional and is constructed from well known circuit elements used in optical disc players.

The flow chart in FIG. 2 comprises the following blocks for illustrative purposes:
  201 Focus tracking ON;
  203 Decision: Radial tracking ON?;
  205 Select focus offset value which minimizes jitter;
  207 Apply a plurality of focus error offset values to the reader;
  209 Decision: Minimize or optimize RVC?;
  211 Measure RVC;
  213 Select focus error offset values which minimizes RVC;
  215 Measure RVC and other parameters after each focus error offset value is applied; and
  217 Select focus error offset value which gives optimized RVC while maintaining signal quality of at least one parameter above a predetermined level.

FIG. 2 is a flow chart illustrating a method according to the invention for minimizing or optimizing radial to vertical crosstalk in an optical disc player. Since radial to vertical crosstalk only occurs when the focus tracking is on and the radial tracking is off. As a result, it is first confirmed that the focus tracking is on in the optical disc reader in step 201. It is determined if the radial tracking is on in step 203. If the radial tracking is on, then there will be no problem with radial to vertical crosstalk. As a result, a counter measure can be selected which minimizes jitter in the reader. It will be understood by those skilled in the art that a variety of counter measures, for example, focus offset values, focus bandwidth, etc., can be used in the invention to reduce jitter. This embodiment will focus on focus offset values being used as the counter measure, but the invention is not limited thereto. In this embodiment, the focus offset value which minimizes jitter is selected by the controlling microprocessor 11 in step 205 and applied to the optical disc reader.

If it is determined in step 203 that the radial tracking is off, then radial to vertical crosstalk becomes an issue for the reader. As mentioned above, the radial to vertical crosstalk interferes with the detected focus error signal which causes the focus actuator to be unnecessarily driven. In this embodiment of the invention a plurality of focus error offset values are applied to the optical disc reader in step 207.

If it is determined that the goal of the operation is to simply minimize the radial to vertical crosstalk in step 209, the radial to vertical crosstalk is determined by the PID controller 6 after each focus error offset value is applied to the optical disc reader in step 211. Then the focus error offset value which results in the lowest radial to vertical crosstalk value is selected by the controlling microprocessor 11 to be applied to the optical disc reader in step 213.

If it is determined that the goal of the operation is to optimize the radial to vertical crosstalk with respect to other parameters in step 209, these other parameters need to be measured. In this embodiment of the invention, an optimized radial to vertical crosstalk value is the lowest value of radial to vertical crosstalk available while the signal quality of at least one parameter is above a predetermined value. In this embodiment of the invention, various optical parameters can be used, e.g. HF or wobble quality, error signal amplitude, etc., and the invention is not limited thereto. For example, some of the error signals measured by the optical disc reader may be minimized to the point where they are useless if the focus error offset value reduce the radial to vertical crosstalk to its minimum level. Thus, the focus error offset value which best balance the desire to minimize radial to vertical crosstalk with the need to maintaining the signal quality of error signals above a predetermined level needs to be determined. In this embodiment of the invention, the radial to vertical crosstalk value and the values of other parameters are determined by the PID controller 6 after each focus error offset value is applied in step 215. The focus error offset value which minimizes the radial to vertical crosstalk and maintains the signal quality of the other parameters above a predetermined level is selected by the controlling microprocessor and applied to the optical disc reader in step 217.

A specific example of the method described above will now be disclosed with reference to FIGS. 3($a$)-($c$). In this example, focus error offset values are applied to the system. This example tries to minimize the radial to vertical crosstalk by minimizing the power dissipation of the focus actuator while maintaining the signal quality of the radial error signal and the focus error signal being measured by the optical disc reader. FIG. 3($a$) illustrates measured voltage readings for several parameters including the voltage of the focus actuator (Vfocus), the radial error signal (Ren) and the focus error signal (Fen) when zero focus error offset is being applied to the optical disc reader. In this situation, Vfocus=1.59+1.43=3.02 V (to peak), Ren=1.05+0.77=1.82 V (peak to peak), and Fen=0.081+0.129=0.21V (peak to peak). A +20 offset value is the applied to optical disc reader and the parameters are measured again. As illustrated in FIG. 3 ($b$), when a +20 focus error offset value is used Vfocus=1.11+0.79=1.9V, Ren=0.525+0.237=0.762V, and Fen=0.380–0.216=0.164V. So while this offset value has decreased the focus actuator power dissipation by over $(1.9^2/3.02^2)=40\%$, the offset value has also decreased the radial error signal by over 58%.

This may make the radial error signal too low to be of any use. A second focus offset value of −20 is the applied and the results can be found in FIG. 3(c). When a focus offset value of −20 is used, Vfocus=1.19+0.87=2.06V, Ren=1.05+0.65=1.7V, and Fen=0.426−0.247=0.179V. In this case, the focus actuator power dissipation is decreased by approximately $(2.06^2/3.02^2)=47\%$ while the radial error signal has only been decreased by 7%. Thus, if the radial error signal is above a predetermined signal quality level, the −20 focus error offset value should be selected to be applied to the optical disc reader. It will be understood that more focus error offset values can be tried and compared before a value is selected.

Applications and use of the above described method and apparatus according to the invention are various and include exemplary fields such as optical disc players and recorders.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different uses than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for reducing radial to vertical crosstalk (RVC) in an error signal in an optical record carrier reader, comprising the acts of:
    applying focus error offset values to the reader;
    determining radial to vertical crosstalk after each focus error offset value is applied; and
    measuring signal quality levels of at least one parameter after each focus error offset value is applied; and
    selecting the focus error offset value which optimizes the radial to vertical crosstalk (RVC) while maintaining a quality of the at least one parameter above a predetermined level,
    wherein the at least one parameter includes a focus error signal.

2. The method according to claim 1, wherein the applying act comprises applying the focus error offset values to a focus offset control loop of the reader.

3. The method according to claim 1, wherein said at least one parameter is at least one signal and the quality of the parameter is the signal quality of the signal.

4. The method of claim 1, wherein the at least one parameter further includes a radial error signal.

5. A system for reducing radial to vertical crosstalk (RVC) in an error signal in an optical record carrier reader, said system comprising:
    a pre-processor configured to apply a plurality of focus error offset values to the reader;
    a controller configured to determine a radial to vertical crosstalk after each of the focus error offset values applied to the reader, the controller being further configured to measure signal quality levels of at least one parameter after each focus error offset value is applied to the reader; and
    a processor configured to select the focus error offset value which minimizes the radial to vertical crosstalk (RVC) for use by the reader, selecting the focus error offset value which reduces and optimizes the radial to vertical crosstalk (RVC), wherein the processor is further configured to select the focus error offset value which optimizes the radial to vertical crosstalk (RVC) while maintaining a quality of the at least one parameter above a predetermined level, and wherein the at least one parameter includes a focus error signal.

6. The system according to claim 5, wherein the pre-processor is further configured to apply focus error offset values to a focus offset control loop of the reader.

7. The system according to claim 5, wherein said at least one parameter is at least one signal and the quality of the parameter is the signal quality of the signal.

8. The system of claim 5, wherein the at least one parameter further includes a radial error signal.

9. A non-transitory tangible computer-readable medium having embodied thereon a computer program for processing by a computer, the non-transitory computer program comprising code segments for reducing radial to vertical crosstalk in an error signal in an optical record carrier reader, said code segments comprising:
    a first code segment for applying focus error offset values to the reader;
    a second code segment for determining radial to vertical crosstalk (RVC) after each focus error offset value is applied; and
    a third code segment for measuring signal quality levels of at least one parameter after each focus error offset value is applied; and
    a fourth code segment for selecting the focus error offset value which reduces and optimizes the radial to vertical crosstalk while maintaining the quality of the at least one parameter above a predetermined level,
    wherein the at least one parameter includes a focus error signal.

10. The non-transitory tangible computer-readable medium according to claim 9, wherein the focus error offset values are applied to a focus offset control loop of the reader.

11. The non-transitory tangible computer-readable medium according to claim 9, wherein said at least one parameter is at least one signal and the quality of the parameter is the signal quality of the signal.

12. The non-transitory tangible computer-readable medium of claim 9, wherein the at least one parameter further includes a radial error signal.

* * * * *